US012607409B2

(12) United States Patent
Bertolissio et al.

(10) Patent No.: US 12,607,409 B2

(45) Date of Patent: Apr. 21, 2026

(54) STEEL MAKING PLANT WITH ELECTRIC ARC FURNACE

(71) Applicant: SMS GROUP S.P.A., Tarcento (IT)

(72) Inventors: Arrigo Bertolissio, Tarcento (IT); Andrea Lanari, Tarcento (IT)

(73) Assignee: SMS GROUP S.P.A., Tarcento (IT)

( * ) Notice: Subject to any disclaimer, the term of this patent is extended or adjusted under 35 U.S.C. 154(b) by 940 days.

(21) Appl. No.: 17/795,147

(22) PCT Filed: May 5, 2022

(86) PCT No.: PCT/IB2022/054162

§ 371 (c)(1),
(2) Date: Nov. 17, 2022

(87) PCT Pub. No.: WO2022/238822

PCT Pub. Date: Nov. 17, 2022

(65) Prior Publication Data

US 2024/0210115 A1 Jun. 27, 2024

(30) Foreign Application Priority Data

May 11, 2021 (IT) ........................ 102021000012065

(51) Int. Cl.
*F27D 17/30* (2025.01)
*C21C 5/40* (2006.01)
(Continued)

(52) U.S. Cl.
CPC .............. *F27D 17/304* (2025.01); *C21C 5/40* (2013.01); *C21C 5/4673* (2013.01); *C21C 5/52* (2013.01);
(Continued)

(58) Field of Classification Search
CPC ..... F21D 17/304; F21D 17/20; C21C 5/4673; C21C 5/52; C21C 5/40; C21C 2100/02; C21B 2100/40
See application file for complete search history.

(56) References Cited

U.S. PATENT DOCUMENTS 6,269,112 B1 * 7/2001 Poloni .................... C21C 5/527 373/84
9,005,570 B2 4/2015 Baldauf
2011/0318247 A1 12/2011 Fedi

FOREIGN PATENT DOCUMENTS

CN 107485951 A * 12/2017 ............ B01D 50/10
CN 110252111 A 9/2019
(Continued)

OTHER PUBLICATIONS

Moulton, Brad. Applying SCR NOx reduction in high-dust environments. Power Engineering International. 13 pages. (Year: 2015).*
(Continued)

*Primary Examiner* — Tima M. Mcguthry-Banks
(74) *Attorney, Agent, or Firm* — Merchant & Gould P.C.

(57) ABSTRACT

A steel making plant includes an electric arc furnace and a fume collection and treatment system. The system includes a first primary suction line fluidically connected to the electric arc furnace to suck fumes generated in the electric arc furnace. A secondary suction line is for ventilating the environment surrounding the electric arc furnace by a suction hood. A filtration apparatus is for filtering emissions collected by the fume collection and treatment system before they are discharged into the atmosphere. The electric arc furnace is powered by a continuous charging system. A fume cooling apparatus, a dust collecting device and a denox selective catalytic reduction apparatus are arranged in sequence along the first primary suction line, starting from the electric arc furnace. The secondary suction line flows
(Continued)

into the first primary suction line downstream of the denox selective catalytic reduction apparatus and upstream of the filtration apparatus.

17 Claims, 2 Drawing Sheets

(51) Int. Cl.
*C21C 5/46* (2006.01)
*C21C 5/52* (2006.01)
*F27D 17/20* (2025.01)

(52) U.S. Cl.
CPC .......... *F27D 17/20* (2025.01); *C21B 2100/40* (2017.05); *C21C 2100/02* (2013.01)

(56) References Cited

FOREIGN PATENT DOCUMENTS

| | | | | | |
|---|---|---|---|---|---|
| CN | 110793338 | A | * | 2/2020 | ............. B01D 53/70 |
| CN | 111112287 | A | | 5/2020 | |
| JP | 1989457373 | A | | 1/1991 | |
| JP | H1157373 | A | | 3/1999 | |
| JP | 3060441 | B2 | | 7/2000 | |
| JP | 2000288351 | A | | 10/2000 | |
| JP | H11050128 | A | | 9/2002 | |
| JP | 3837862 | B2 | * | 10/2006 | |
| JP | 2007198668 | A | | 8/2007 | |
| JP | 2014505169 | A | | 2/2014 | |
| KR | 101166476 | B1 | | 7/2012 | |
| SU | 980839 | A1 | * | 12/1982 | |
| WO | WO-2022029568 | A1 | * | 2/2022 | ............. F27D 17/10 |

OTHER PUBLICATIONS

CN 107485951 A. Machine translation (Year: 2017).*
CN 110793338 A. Machine translation (Year: 2020).*
JP 3837862 B2. Machine translation (Year: 2006).*
SU 980839 A1. Machine translation (Year: 1982).*
European Article 94(3) received for EP Application No. 22727433.9 on Jul. 12, 2023, 5 pgs.
Saudi Arabian Office Action received for SA Application No. 523451479 on Jan. 30, 2024, 6 pgs.
International Search Report and Written Opinion of the International Searching Authority for International Patent Application No. PCT/IB2022/054162 mailed Aug. 29, 2022, 13 pages.
Italian Search Report for Italian Patent Application No. 102021000012065 dated Nov. 23, 2021, 2 pages.
Japanese Office Action received for JP Application No. 2023-569955 on Nov. 11, 2025, 7 pgs.

* cited by examiner

STEEL MAKING PLANT WITH ELECTRIC ARC FURNACE

This application is a National Stage Application of PCT/IB2022/054162, filed 5 May 2022, which claims benefit of Ser. No. 102021000012065, filed 11 May 2021 in Italy, and which applications are incorporated herein by reference. To the extent appropriate, a claim of priority is made to each of the above-disclosed applications.

FIELD OF APPLICATION

The present invention relates a steel making plant with an electric arc furnace.

Background Art

Typically, the direct melting of materials which contain iron, such as scrap, is performed in electric arc furnaces (EAF).

The primary feedstock for EAFs is ferrous scrap, which can consist of scrap coming from within the steel mill, scraps, waste from mechanical industries (e.g., vehicle manufacturers), and demolition or post-consumer scrap (e.g., end-of-life products such as cars, buildings).

Direct reduced iron (DRI) is also increasingly being used as a feedstock for EAFs because of its low gangue content, lower content of undesired metals (e.g. copper), and low CO2 footprint in the manufacturing process.

Finally, liquid pig iron could also be used in the material mix to feed an electric arc furnace.

An electric arc furnace is usually charged with scrap and/or DRI and/or liquid pig iron by:

- metal baskets: the scrap/DRI is usually loaded into baskets and then charged into the furnace after opening the roof;
- continuous wall charging systems: vibrating, traversing or rotating conveyors for scrap/DRI continuously discharge raw materials into the furnace; instead, liquid pig iron is charged with dedicated chutes; continuous wall charging may include scrap preheating or not.
- continuous charging system from the roof: vibrating, translating, rotating or pneumatic conveyors for DRI/scrap discharge the raw material onto a dedicated opening of the furnace roof (called 5th hole or 3rd hole).

Secondary metallurgy is performed on the molten steel after melting in the EAF to the casting point. It is typically performed at ladle treatment stations, with the molten steel remaining in the ladle itself. These treatment stations generally consist of an arc heating unit, called a ladle furnace (LF), which allows the final temperature of the liquid steel for the casting operation to be adjusted. The treatment involves the addition of scarifying agents and binding elements to regulate the chemical composition of the finished steel. In some cases, the vacuum processing units are used to achieve special gas content requirements.

A simplified diagram of a steel plant provided with an electric arc furnace and a ladle furnace is shown in FIG. 1.

Fume Collection Systems

A steel making plant generally comprises an emission collection system, which in particular can suck the emissions generated during the melting process, and convey them to a treatment system.

Each electric arc furnace (EAF) and ladle furnace (LF) is provided with its own suction system. In FIG. 1, the EAF suction system is shown as P1, while the LF suction system is shown as P2. Suctions P1 and P2 are named primary suctions.

In the EAF, primary suction may be performed either through an appropriate hole in the furnace roof (called the 4th hole or 2nd hole) or through the material feed channel into furnaces with continuous charging systems. In the latter case, the fumes are sucked through the continuous charging system and preheat the scrap before it is charged into the EAF.

Furthermore, the EAF electric arc furnace is provided with a hood C located on the roof of the building containing the furnace. The function of the hood C is to ventilate the building during the melting step and to collect the fumes generated inside the building following the opening of the furnace roof during the basket loading step. This additional suction system of the EAF is referred to as secondary suction and is indicated by S1 in FIG. 1.

The gases emitted in the basket loading step are diffused inside the building and are strongly diluted before being collected by hood C. The secondary suction S1 must thus treat much larger volumes of fumes than the primary suction P1. For this reason, the suction capacity of the secondary suction system is much greater than that of the primary suction. Furthermore, due to dilution, the fumes treated by the secondary suction system S1 are much cooler than those treated by the primary suction.

The fumes collected from the suction systems of the EAF and the LF contain dust, nitrogen oxides and sulfur oxides, carbon monoxide, and organic pollutants, e.g., such as volatile organic compounds (VOCs), chlorobenzenes, polychlorinated biphenyls (PCBs), polycyclic aromatic hydrocarbons (PAHs), dioxins (PCDDs), and furans (PCDFs). The presence of organics in emissions depends primarily on the quality of the scrap used.

As shown in the diagram in FIG. 1, there may also be other points of possible fume emissions in the steel making plant, e.g., such as the dust collection of additive conveyor systems AD, the zones of refractory demolition and lining of the ladle L and the tundish P, and the handling of slag MS. These emissions are a consequence of mechanical activities, not of a combustion and/or melting process; for these reasons, they contain mainly dust, and not gaseous emissions, such as nitrogen and sulfur oxides. The fume collection system thus comprises auxiliary suctions A1, A2 and A3 dedicated to these possible emission points.

FIG. 1 diagrammatically shows a fume collection and treatment system in a steel making plant provided with an EAF.

The fume collection and treatment system comprises a main duct L1 into which all the suction systems P1, P2, S1, A1, A2 and A3 discharge; all the fumes collected by the suction systems are led to a fume treatment system, which will be explained in greater detail below, through the main duct L1.

Primary suction P1 from EAF electric arc furnace: the hot fumes from the EAF furnace are collected from the furnace roof through a water-cooled elbow, and conveyed to a cooled chamber CH, where the post-combustion of the CO generated in the melting process is completed; the primary fumes are sucked in at a high temperature (over 1000° C.) and are then cooled by means of water-cooled ducts CH, and then by water cooling towers QT or convection exchangers (natural or forced) to reduce the temperature so that they can be treated downstream in a bag filter BF installed in the main duct L1 and part of the fume treatment system.

Primary suction P2 from ladle furnace LF: the fumes are collected from the LF furnace roof with a single-wall (uncooled) pipe and conveyed into the main duct L1 of the fume system. The temperature of the fumes sucked from the LF is below 180° C.

Secondary suction S1 from EAF electric arc furnace: the hood C, installed on top of the building, captures the fumes during the EAF charging steps and allows ventilation during the melting steps; it also allows the suction of the air necessary to further cool the fumes collected by the primary suction P1 before being processed in the bag filter BF.

Auxiliary suction points A1, A2, and A3: the fume collection system may comprise auxiliary suction points which depend on site-specific plant configurations, which may include, for example, material or additive handling, tundish ladle demolition, tundish ladle tipping, EAF refractory material demolition, etc.

Fume Treatment System

The collected fumes are treated in a bag filter BF and then dispersed into the atmosphere.

Substantially, the bag filters capture dust, including all heavy metals present as particulate matter at the filtering temperature, as well as some organic compounds.

Generally, adsorbing materials (e.g. activated carbon, pulverized activated lignite coke or mixtures of these with lime, clay) are dosed in the fume main duct L1 upstream of the bag filter by means of an appropriate dosing device ADS to reduce persistent organic pollutants, in particular, to control the content of PCDD dioxins and PCDF furans. The adsorbent material is retained by the filter bags BF and, after absorbing dioxins and furans, is disposed of with the dust collected by the filter.

Currently, the fume treatment systems of a steel making plant are configured to abate the following pollutants:

- Dust, in the bag filter with mechanical filtration;
- Dioxins by injecting activated carbon or lignite or clay before the filter to adsorb dioxins; the injected adsorbent is collected in the filter along with the dust; the dust is a special waste (containing heavy metals, dioxins, organics etc.) and must be properly treated/disposed of.

However, the current fume treatment systems in a steel making plant do not allow the abatement of NOx in the gaseous emissions.

NOx is contained upstream through combustion control techniques. To date, however, technologies for the abatement of NOx from post-combustion emissions have not yet been successfully implemented in steel making plants with electric arc furnaces, despite the wide availability of such technologies applied to plants, such as fossil fuel boilers, incinerators, etc.

NOx formation occurs through several mechanisms.

In the case of an EAF, NOx is formed primarily by thermal dissociation and the successive reaction of nitrogen and oxygen molecules in the combustion air, referred to as "thermal" NOx. The other NOx formation mechanisms, i.e., "fuel NOx" (due to the evolution and reaction of nitrogen compounds in fuels with oxygen) and "prompt NOx" (due to the formation of hydrogen cyanide HCN followed by oxidation to NOx) make minor contributions to NOx emissions from an EAF.

Post-combustion NOx abatement and control systems include:

- selective Catalytic Reduction (SCR);
- non-Selective Catalytic Reduction (NSCR); and
- selective Non-Catalytic Reduction (SNCR).

In greater detail, SCR units utilize a nitrogen-based reagent, such as ammonia (NH3) or urea, to chemically reduce NOx into molecular nitrogen and water vapor. The reagent is injected through a system of injectors into the fume stream, upstream of a catalytic bed or reactor. The exhaust gas mixes with the reactant and enters a reactor module containing the catalyst. Hot combustion gas and the reactant diffuse through the catalyst, in which the reactant selectively reacts with NOx; the reactions occur if fume temperatures are within a specific range. Generally, operating temperatures comprised between 220° C. (430° F.) and 420° C. (800° F.) of the gas stream are required in the catalytic bed for the catalytic reduction process to occur efficiently. The reaction between NH3 and NOx is promoted by the presence of excess oxygen (greater than 1%).

Below the optimal temperature range, the catalyst activity is greatly reduced, potentially allowing direct emission of unreacted ammonia (known as "ammonia slip") into the atmosphere. The SCR systems may also be subject to catalyst deactivation over time, due to physical deactivation and/or chemical poisoning.

For an SCR system to effectively reduce NOx emissions, the exhaust gas stream must thus be fed with relatively stable gas flow rates, NOx concentrations, and temperature.

On the other hand, it is known that the operating conditions vary widely during the melting cycle in terms of gas flow rates, temperatures, and NOx concentrations in EAF fume treatment systems, making denox systems inapplicable.

In particular, the SCR system cannot be installed after particulate removal due to low fume temperatures (90° C./195° F. to 150° C./300° F.), well outside the effective operating range.

There are currently no known applications of SCR technology to control NOx emissions in steel plants with EAFs. Indeed, NOX abatement (denox) systems are considered technically unfeasible due to the unresolved technical problems outlined above.

Thus, in the reference technical field, the need to abate NOx from the gaseous emissions of a steel plant with an electric arc furnace is still completely unsatisfied.

SUMMARY OF THE INVENTION

Therefore, it is the main object of the present invention to eliminate the drawbacks of the aforementioned prior art either entirely or in part by providing an electric arc furnace steel plant which is equipped with a fume collection and treatment system 5 capable of efficiently abating NOx by means of SCR-type denox apparatus.

It is a further object of the present invention to make available an electric arc furnace steel making plant which is provided with a fume collection and treatment system capable of efficiently abating NOx through SCR-type denox apparatus while being operationally reliable and simple to operate.

It is a further purpose of the present invention to make available a method of collecting and treating the fumes generated by an electric arc furnace steel plant which allows efficiently abating NOx from the emissions generated by the plant itself.

BRIEF DESCRIPTION OF THE DRAWINGS

The technical features of the invention according to the aforesaid objects may be clearly found in the contents of the claims hereinbelow and the advantages thereof will become more apparent from the following detailed description, given with reference to the accompanying drawings which show one or more embodiments merely given by way of non-limiting example, in which:

DETAILED DESCRIPTION

Figure 1:
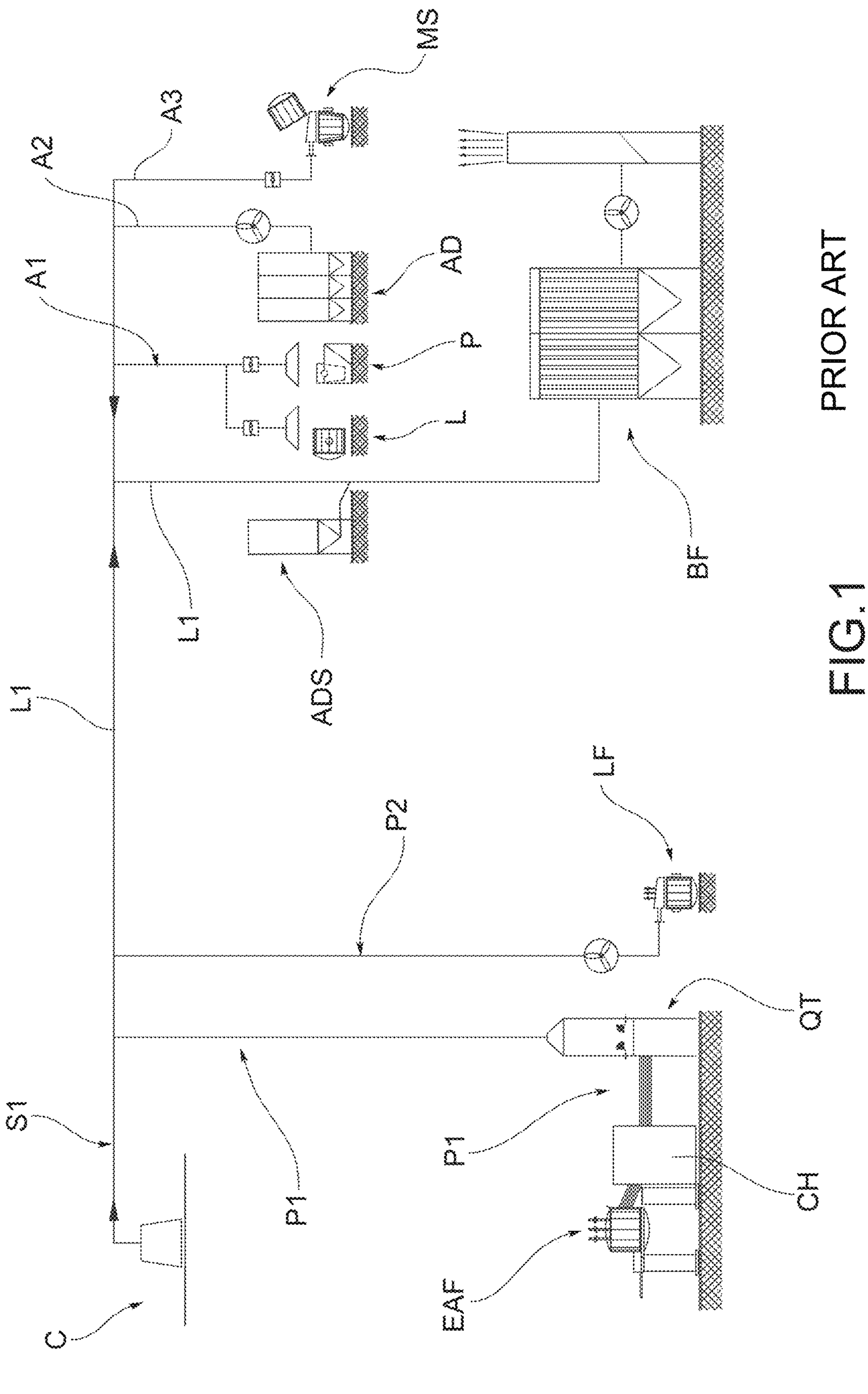
PRIOR ART FIG. 1
FIG. 1 shows a simplified diagram of a steel making plant with an electric arc furnace provided with a traditional fume collection and treatment system.
Figure 2:
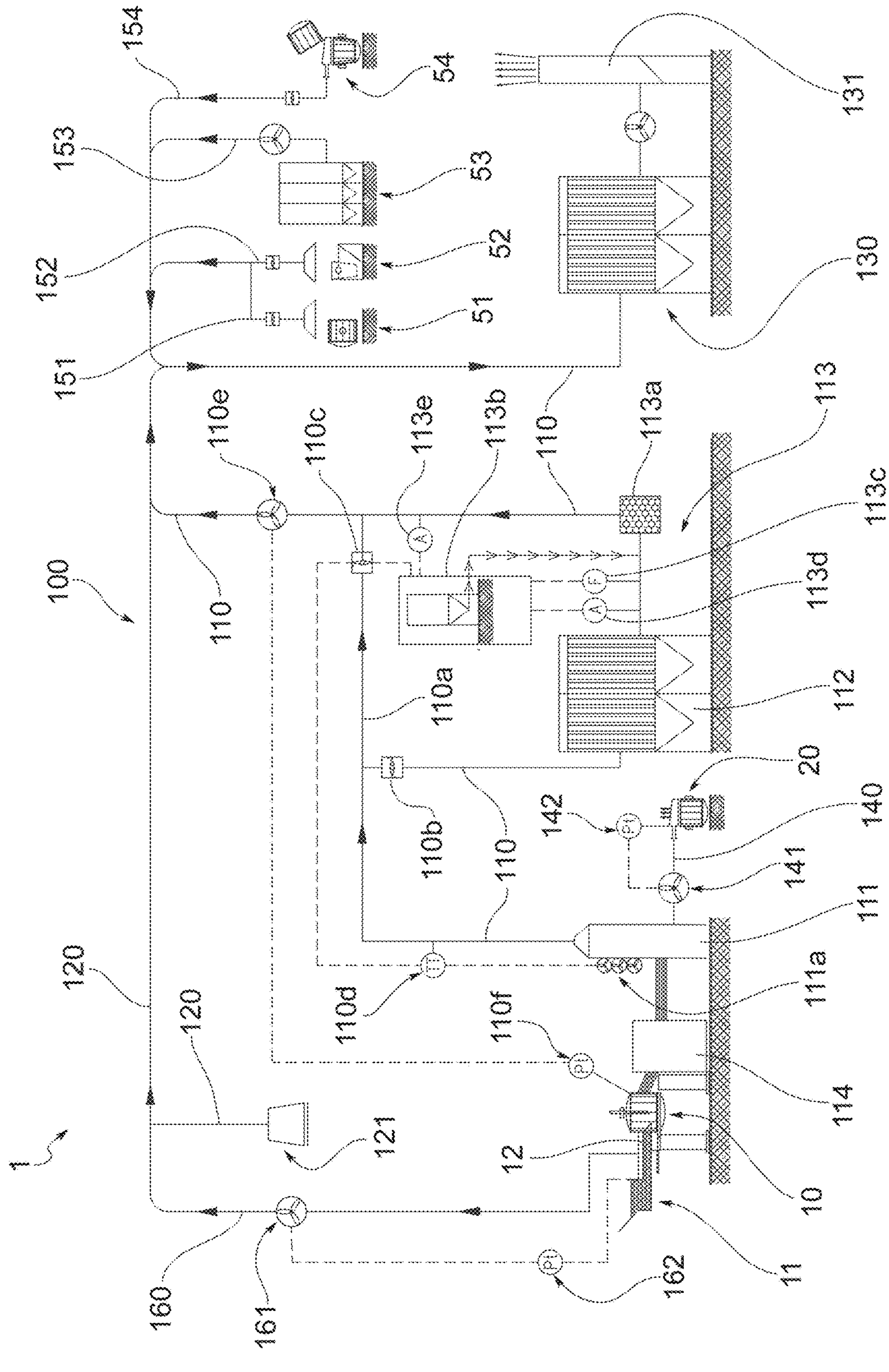
FIG. 2 shows a simplified diagram of an electric arc furnace steel making plant provided with a fume collection and treatment system according to a preferred embodiment of the invention.

The electric arc furnace steel making plant according to the invention is indicated as a whole by reference numeral 1 in FIG. 2.

According to a general embodiment of the invention, the steel making plant 1 comprises at least one electric arc furnace 10 and a fume collection and treatment system 100 suitable to collect and treat gaseous emissions produced by said steel making plant 1.

In this description and the appended claims, the expressions "gaseous emissions," "emissions," or "fumes" are synonymous and, unless expressly stated otherwise, refer generically to gas and dust mixtures generated during the operation of steel making plant 1. The composition of said gaseous emissions varies according to the zone of steel making plant 1. In some zones, said emissions may contain primarily only dust, such as in the dust collecting apparatus of the additive transport systems, the ladle and tundish h refractory material demolition and lining areas, or in the slag handling area. In the case of the electric arc furnace, said emissions contain, in addition to dust, combustion products such as nitrogen oxides and sulfur oxides, carbon monoxide and organic pollutants, e.g., such as volatile organic compounds (VOC), chlorinated benzenes, polychlorinated biphenyls (PCB), polycyclic aromatic hydrocarbons (PAH), dioxins (PCDD) and furans (PCDF). The presence of organics in emissions depends mainly on the quality of the feedstock used. On the other hand, in the case of the ladle furnace, said emissions mainly contain only NOx and dust.

According to the aforesaid general embodiment, the fume collection and treatment system 100 comprises:

- a first primary suction line 110 fluidically connected to the electric arc 10 to suck in the fumes generated in said electric arc furnace 10;
- a secondary suction line 120 suitable to ventilate the environment surrounding the electric arc 10 by means of at least one suction hood 121.

Preferably, the electric arc furnace 10 is installed inside a building (not illustrated in the diagram in FIG. 2). The suction hood 121 is installed near the and is used to ventilate the 20 roof of said building environment surrounding the furnace 10 and delimited by the building.

Furthermore, as shown in FIG. 2, the fume collection and treatment system 100 comprises at least one filtration apparatus 130 suitable to filter the emissions collected by said fume collection and treatment system 100 before they are discharged into the atmosphere. As shown in FIG. 2, the treated fumes may be discharged into the atmosphere through a stack 131.

The aforesaid at least one filtration apparatus 130 may be of any type suited for the purpose. Preferably, the filtration apparatus 130 is a bag filter.

According to the invention, the electric arc furnace is fed by a continuous charging system 11.

By virtue of this contrivance, it is not necessary to open the furnace roof and thus the direct emission of fumes from the electric arc furnace 10 into the surrounding environment is avoided during the charging steps of the electric arc furnace 10. Thus, the air sucked from the secondary suction line 120 through the suction hood 121 is not substantially contaminated by fumes directly from the electric arc furnace 10. Indeed, the fumes remain substantially confined to the furnace 10 and/or the continuous charging system 11, and emissions are limited to only small amounts due to unavoidable leaks. In particular, the air sucked from the secondary suction line 120 contains no NOx or negligible concentrations thereof. Operationally, the NOx generated by the electric arc furnace 10 is thus substantially all sucked from the primary suction line 110.

In particular, the continuous charging system 11 of the electric arc furnace 10 is of the type connectable to a furnace wall 10 or the furnace roof 10.

In particular, the first primary suction line 110 may be fluidically connected to the electric arc furnace through a hole made in the furnace roof 10 or through a material feed channel of the continuous charging system 11.

According to the invention, the following are arranged in sequence along said primary suction line 110 starting from the electric arc furnace 10:

- a fume cooling apparatus 111;
- a dust collecting device 112; and
- a denox selective catalytic reduction (SCR) apparatus 113.

Again according to the invention, the secondary suction line 120 flows into the first primary suction line 110 downstream of the denox selective catalytic reduction 113 and upstream of said at least one filtration apparatus 130.

By virtue of the invention, the fumes collected from the primary suction line 110 are fed to the denox SCR apparatus 113 before said fumes are combined with fumes collected from the secondary suction line 120 and then sent to the filtration apparatus 130. Thus, the fumes sucked from the electric arc furnace 10 are not diluted and cooled with the fumes drawn from the secondary suction line 120. Thus, the denox SCR apparatus can be operated under stable and controllable conditions; in particular, the denox SCR apparatus 113 can treat uncooled fume and undiluted NOx. Thus, it is possible to efficiently abate NOx generated in a steel making plant 1 using a denox SCR apparatus 113.

Furthermore, by virtue of the fact that upstream of the denox SCR apparatus 113, the first primary suction line 110 comprises a fume cooling apparatus 111 and a dust collecting device 112, the fumes collected from the first primary suction line 110 can be preventively:

- cooled to take the temperature of such fume into a predetermined temperature range as a function of the operating requirements of the denox SCR apparatus 113; and
- removed of dust, to prevent an excessively high concentration of dust from damaging the catalytic bed of the denox SCR apparatus 113.

The dust collecting device 112 may be any dust filtration device suited for the purpose and capable of treating the fumes generated by the electric arc furnace 10.

Preferably, said dust collecting device 112 is an electrofilter, also known as an electrostatic precipitator. The electrostatic precipitator is a device without mechanical filtration which removes particles, such as dust and fumes, from a gaseous stream using the force of an electrostatic charge induced on the dust.

Preferably, as shown in FIG. 2, the denox SCR selective catalytic reduction apparatus 113 comprises:

a catalytic bed or reactor 113*a* fluidically connected to the primary suction line 110 to be crossed by the fumes; and dosing means 113*b* of a nitrogen-based reagent (e.g., ammonia and/or urea) suitable to inject a metered amount of said reagent into the section of the primary suction line 110 upstream of the catalytic bed 113*a*.

In particular, the dosing means 113*b* are suitable to inject the reagent upstream or downstream of the dust collecting device 112. Preferably, as shown in FIG. 2, the dosing means 113*b* are suitable to inject the reagent into the section of the primary suction line 110 between the dust collecting device 112 and the catalytic bed 113*a*.

Advantageously, the dosing means 113*b* are controlled by a control system to adjust the dosed amount of the nitrogen-based reagent as a function of:

the fume flow rate at the inlet to the catalytic bed 113*a*, as measured by means of at least one flow meter 113*c;* the NOx concentration upstream and/or downstream of the catalytic bed 113*a*, as detected by one or more gas analyzers 113*d* and 113*e*.

The operation of a denox SCR apparatus is well known in itself to a person skilled in the art and will thus not be described in detail.

The denox SCR apparatus uses a nitrogen-based reagent, such as ammonia (NH3) or urea, to chemically reduce NOx nitrogen oxides into molecular nitrogen and water vapor. The reagent is injected into the fume stream either before or after the dust collecting device 112, upstream of the catalytic bed. The reagent flow is automatically controlled by the automation/control system by means of gas analyzers and flow meters installed in the fume streams, which make it possible to measure the amount of pollutants and the reagent "slip".

Advantageously, the catalyst with nitrogen-based reagent injection abates down NOx, but it also can chemically reduce dioxins, furans, and carbon monoxide CO. By virtue of this capacity, it is possible to avoid the insertion in the fume collection and treatment system of an injection apparatus of adsorbing materials (e.g. activated carbon, pulverized activated lignite coke or mixtures of these with lime, clay) traditionally provided in the known fume collection and treatment systems to abate dioxins and furans and CO from the fumes. The elimination of the adsorbent injection apparatus leads to a reduction in operating costs for material injected and for the amount of dust produced and collected in the filtration apparatus 130.

Operationally, the choice was made to abate NOx through denox SCR systems and not through Non-Selective Catalytic Reduction (NSCR) denox systems for the following reasons.

In NSCR non-selective catalytic reduction systems, CO, NOx and hydrocarbons are converted to CO2 and N2 through a catalyst. This technique does not require the injection of additional reagents because unburned hydrocarbons are used as reducing agents. However, the gases must have very low oxygen contents. NOx removal occurs in two sequential steps: —in step 1, the reactions remove excess oxygen, because the latter reacts better with CO and hydrocarbons than with NOx; —in step 2, the hydrocarbons react with the NOX in the mixture, reducing them. This is why the concentration of oxygen in the fume must be very low, in particular below 0.5%. Therefore, NSCR systems can only be used with fuel-rich, oxygen-poor mixtures. However, said limitation does not apply to denox SCR systems, which can thus also treat oxygen-rich mixtures, such as those that characterize the fumes extracted from an electric arc furnace.

Preferably, as shown in FIG. 2, the first primary suction line 110 comprises at least one fan 110*e*, the actuation of which is controlled by a control system to modulate the suction capacity as a function of the pressure inside the electric arc furnace 10 as measured by at least one pressure sensor 110*f.*

The production of steel in an EAF is a discontinuous process in which melting steps alternate with molten steel tapping and/or charging steps. During the tapping steps, the fumes generated by the electric arc furnace are cold and the production of NOx emissions is essentially negligible. If the fumes captured during the tapping steps were conveyed to the denox SCR apparatus, they could cool the catalytic bed below the operating temperature and damage the system.

For this reason, the first primary suction line 110 preferably comprises a by-pass line 110*a*, which fluidically connects the section of the first primary suction line 110 upstream of the denox selective catalytic reduction 113 with the section of the first primary suction line 110 downstream of the denox SCR apparatus 113.

In particular, as shown in FIG. 2, the by-pass line 110*a* fluidically connects the section of the first primary suction line 110 comprised between the fume cooling apparatus 111 and the dust collecting device 112 to the section of the first primary suction line 110 comprised between the denox selective catalytic reduction apparatus 113 and the filtration apparatus 130.

Advantageously, the first primary suction line 110 is provided with one or more by-pass 110*b*, 110*c*, which are suitable to adjust the passage of fumes through the by-pass 110*a*, and the actuation of which is controlled by a control system as a function of the temperature of the fumes coming out from the fume cooling apparatus 111, measured by at least one temperature sensor 110*d.*

Operationally, when temperature sensor 110*d* detects a temperature of the fume coming out from the cooling apparatus 111 below a predetermined value, said one or more by-pass valves 110*b*, 110*c* are actuated to allow the fumes to pass through the by-pass line 110*a*, preventing passage through the catalytic bed 113*a* at the same time.

The melting process in an EAF generates significant amounts of carbon monoxide CO. For such reason, a fume post-combustion chamber 114 is preferably arranged upstream of the fume cooling apparatus 111 in the aforesaid first primary suction line 110. In said post-combustion chamber it is possible to burn CO and significantly reduce its concentration in the fumes.

Advantageously, the fume cooling apparatus 111 is suitable to generate an adjustable cooling capacity such that the fume exiting said apparatus 111 has a temperature within a predetermined temperature range as a function of the operating requirements of the denox SCR apparatus 113. Typically, the operating requirements of the denox SCR apparatus 113 may require a fume temperature range comprised between 220° C. and 350° C.

Preferably, the fume cooling apparatus 111 is feedback-controlled by a control system as a function of the temperature of the fume exiting the apparatus 111 as measured by at least one temperature sensor 110*d.*

According to a preferred embodiment, the aforesaid fume cooling apparatus 111 may comprise a shell and tube exchanger and a plurality of fans 111*a*, the actuation of which is controlled by the control system to modulate the cooling air flow rate over the shell and tube exchanger as a function of the cooling capacity required by the fume cooling apparatus 111.

Alternatively, said fume cooling apparatus 111 may comprise a water cooling tower. However, the shell-and-tube heat exchanger system is preferable to the cooling tower because it avoids the introduction of water into the fumes.

As shown in FIG. 2, the steel making plant 1 may comprise at least one ladle furnace (LF) 20. In this case, the fume collection and treatment system 100 comprises a second primary suction line 140 which:

is fluidically connected to ladle furnace 20 to suck in fumes generated in said ladle furnace 20; and flows into the primary suction line 110 either upstream of the fume cooling apparatus 111 or at the fume cooling apparatus 111.

As mentioned above, the emissions generated by a ladle furnace contain NOx. The fumes sucked from said second primary suction line 140 may be combined with the fumes collected from the first primary suction line 110 and then be treated together in the denox SCR apparatus 113.

However, the fumes generated by ladle furnace 20 and sucked in by said second primary suction line 140 are too cold to be efficiently treated in a denox SCR apparatus. For this reason, they are combined with the fumes generated by the electric arc furnace 10 so as to be heated.

Due to the high temperatures of the fumes generated by the electric arc furnace 10 (further elevated by the eventual post-combustion), the mixture of the two fume streams (from EAF 10 and from LF 20) is still too hot for the denox SCR apparatus. For this reason, the fumes sucked in from said second primary suction line 140 are joined to the fumes sucked in from the first primary suction line 110 upstream of the fumes cooling apparatus 111, to make it possible to effectively control the temperature thereof.

Preferably, the second primary suction line 140 comprises at least one fan 141 the actuation of which is controlled by a control system as a function of the pressure inside the ladle furnace 20 as measured by at least one pressure sensor 142.

As shown in FIG. 2, the steel making plant 1 may comprise one or more auxiliary stations 51, 52, 53, 54 which are suitable to operationally support the steel production activity and are likely to generate emissions containing primarily dust. For example, such stations may be the refractory material demolition and lining zones of the ladle 51 and the tundish 52, a dust collecting zone 53 of the additive conveying system, or a slag handling zone 54. In this case, the aforesaid fume collection and treatment system 100 comprises for each auxiliary station 51, 52, 53, 54 an auxiliary suction line 151, 152, 153, 154 which is fluidically connected to the respective auxiliary station to suck the emissions generated by said station and flows, either directly or indirectly, into the secondary suction line 120 or into the first primary suction line 110 in the section between the denox selective catalytic reduction apparatus 113 and the filtration apparatus 130.

The connection zone between continuous charging system 11 of the furnace and the electric arc furnace 10, being a connection between two moving parts, cannot be closed mechanically and is thus a source of spurious air inputs into the furnace, resulting in increased production of nitrogen oxides from the furnace.

Advantageously, as diagrammatically shown in FIG. 2, the steel making plant 1 may comprise a containment casing 12 suitable to enclose the connection zone between the continuous charging system 11 and the electric arc furnace 10. In such a case, the aforesaid fume collection and treatment system 100 comprises a sealing suction line 160 which is fluidically connected to said containment casing 12 to suck in air that infiltrates inside said containment casing 12. Said sealing suction line 160 flows into secondary suction line 120 or directly into primary suction line 110 in the section comprised between the denox SCR apparatus 113 and the filtration apparatus 130.

Preferably, the sealing suction line 160 comprises at least one fan 161 the actuation of which is controlled as a function of the pressure within the containment casing 12 as measured by at least one pressure sensor 162.

Said sealing system of the connection zone between the furnace and the charging system can be defined as "active" because the suction capacity is regulated based on the pressure measured in the charging zone of the furnace, guaranteeing the correct degree of suction with reference to the operating pressure in the furnace.

It is an object of the present invention to provide a method for collecting and treating the fumes generated by a steel making plant.

The method according to the invention applies to a steel making plant with an electric arc furnace, in particular, such as the one which is the object of the present invention and in particular as described above. For this reason, the method is described below using the same reference numerals used to describe steel making plant 1.

In general, the steel making plant 1 comprises at least one electric arc furnace 10 and a fume collection and treatment system 100 suitable to collect and treat gaseous emissions produced by said steel making plant 1.

The aforesaid fume collection and treatment system 100 comprises:

a first primary suction line 110 fluidically connected to the electric arc 10 to suck in the fumes generated in said electric arc furnace 10;

a secondary suction line 120 suitable to ventilate the environment surrounding the electric arc 10 by means of at least one suction hood 121; and at least one filtration apparatus 130 suitable to filter the emissions collected by said fume collection and treatment 100 before they are discharged into the atmosphere.

The method according to the invention comprises:

preventing the direct emission of fumes into the environment from the electric arc furnace 10 during furnace charging steps 10 by virtue of a continuous charging system 11 so that the air sucked by the secondary suction line 120 is substantially uncontaminated by fumes coming directly from the electric arc furnace 10; and treating the fumes collected by the first primary suction line 110 in a denox selective catalytic reduction apparatus 113 before sending them to the filtration apparatus 130 together with the fumes collected by the secondary suction line 120, so as not to dilute and cool the fumes sucked from the electric arc furnace 10 with the fumes sucked by the secondary suction line 120 before treating them in the denox apparatus 113.

Furthermore, according to the invention, before treating the fumes collected by the first primary suction line 110 in the denox catalytic reduction apparatus 113 said fumes are freed from dust in a dust collecting device 112 and are cooled in a fume cooling apparatus 111, to take the temperature of said fumes within a predetermined temperature range as a function of the operating requirements of the denox apparatus 113.

Preferably, during tapping phases of the molten steel from the electric arc furnace 10 the fumes collected by the first primary suction line 110 are sent to the filtration apparatus 130 by-passing the denox selective catalytic reduction apparatus 113, so as not to send to the denox selective catalytic reduction apparatus 113 cold fumes having temperatures below a predetermined temperature range as a function of the operating requirements of the denox apparatus 113.

Preferably, said steel making plant 1 comprises at least one ladle furnace 20. Said fume collection and treatment system 100 comprises a second primary suction line 140 which is fluidically connected to said ladle furnace 20 to suck in fume generated in said ladle furnace 20. The fumes collected by said second primary suction line 140 are combined with fumes collected by said first primary suction line 110 before cooling them in the fume cooling apparatus 111.

Preferably, the aforesaid steel making plant 1 may comprise one or more auxiliary stations 51, 52, 53, 54 which are intended to operationally support the steel production activity and are likely to generate emissions containing primarily dust. The fume collection and treatment system 100 comprises for each auxiliary station 51, 52, 53, 54 an auxiliary suction line 151, 152, 153, 154 which is fluidically connected to the respective auxiliary station to suck in emissions generated by said station. The emissions collected from each auxiliary suction line 151, 152, 153, 154 are sent directly to the filtration apparatus 130.

The invention provides numerous advantages, some of which have already been described.

The electric arc furnace steel plant 1 according to the invention is provided with a fume collection and treatment system capable of efficiently abating NOx by means of SCR-type denox apparatuses.

The steel making plant 1 with an electric arc furnace according to the invention is provided with a fume collection and treatment system capable of efficiently abating NOx by means of SCR-type denox apparatus, and is at the same time operationally reliable and simple to operate.

The method of collecting and treating the fumes generated by a steel making plant with an electric arc furnace makes it possible to efficiently abate NOx from the emissions generated by the plant itself.

Therefore, the invention thus devised achieves the set objects.

Obviously, in the practice, it may also take shapes and configurations different from the one disclosed above, without because of this departing from the present scope of protection.

Furthermore, all details may be replaced by technically equivalent elements, and any size, shape, and material may be used according to needs.

The invention claimed is:

1. A steel making plant comprising an electric arc furnace and a fume collection and treatment system for collecting and treating the gaseous emissions produced by said steel making plant, wherein said fume collection and treatment system comprises:

a first primary suction line fluidically connected to the electric arc furnace to suck fumes generated in said electric arc furnace;

a secondary suction line configured for ventilating an environment surrounding the electric arc furnace by at least one suction hood; and at least one filtration apparatus configured for filtering emissions collected by said fume collection and treatment system before discharge of the emissions into the atmosphere, wherein the electric arc furnace is fed by a continuous charging system and wherein along said first primary suction line, starting from the electric arc furnace a fume cooling apparatus, a dust collecting device and a denox selective catalytic reduction apparatus are arranged in sequence, and wherein the secondary suction line flows into the first primary suction line downstream of the denox selective catalytic reduction apparatus and upstream of said at least one filtration apparatus; and wherein the first primary suction line comprises a by-pass line fluidically connecting a section of the first primary suction line upstream of the denox selective catalytic reduction apparatus with a section of the first primary suction line downstream of the denox selective catalytic reduction apparatus.

2. The steel making plant according to claim 1, wherein the by-pass line fluidically connects a section of the first primary suction line between the fume cooling apparatus and the dust collecting device with a section of the first primary suction line between the denox selective catalytic reduction apparatus and the filtration apparatus.

3. The steel making plant according to claim 1, wherein the denox selective catalytic reduction apparatus comprises: —a catalytic bed fluidically connected to the first primary suction line for the fumes to pass through; and—means for dosing a nitrogen-based reagent to inject a dosed amount of said reagent into the section of the first primary suction line upstream of the catalytic bed.

4. The steel making plant according to claim 3, wherein the dosing means are controlled by a control system to adjust the dosed amount of the nitrogen-based reagent depending on: —flow rate of the fumes entering the catalytic bed, measured by at least one flowmeter; —NOx concentration upstream and/or downstream of the catalytic bed, measured by at least one gas analyser.

5. The steel making plant according to claim 1, wherein said fume cooling apparatus is configured to generate an adjustable cooling capacity such that the fumes coming out from said apparatus have a temperature within a predefined temperature range according to operating requirements of said denox apparatus, wherein said fume cooling apparatus is feedback-controlled by a control system depending on the temperature of the fumes coming out from said apparatus, measured by at least one temperature sensor.

6. The steel making plant according to claim 5, wherein said fume cooling apparatus comprises a shell and tube exchanger and a plurality of fans, actuation of which is controlled by the control system so as to modulate a cooling air flow rate over the shell and tube exchanger according to a cooling capacity required by the fume cooling apparatus.

7. The steel making plant according to claim 1, comprising at least one ladle furnace, wherein said fume collection and treatment system comprises a second primary suction line which is fluidically connected to the ladle furnace to suck fumes generated in said ladle furnace and flows into the first primary suction line upstream of or at the fume cooling apparatus, and wherein the second primary suction line comprises at least one fan, actuation of which is controlled by a control system depending on the pressure inside the ladle furnace, measured by at least one pressure sensor.

8. The steel making plant according to claim 1, comprising one or more auxiliary stations which are configured for operationally supporting the steel production activity, wherein said fume collection and treatment system comprises for each auxiliary station an auxiliary suction line which is fluidically connected to the respective auxiliary station to suck emissions generated by said station and flows, directly or indirectly, into the secondary suction line or into the first primary suction line in the section between the denox selective catalytic reduction apparatus and the filtration apparatus.

9. The steel making plant according to claim 1, wherein in said primary suction line a fume post-combustion chamber is placed upstream of the fume cooling apparatus.

10. The steel making plant according to claim 1, wherein the first primary suction line is fluidically connected to the electric arc furnace through a hole made in the furnace roof or through a material feed channel of the continuous charging system.

11. The steel making plant according to claim 1, wherein the continuous charging system of the electric arc furnace is connectable to a furnace wall or to the furnace roof.

12. The steel making plant according to claim 1, wherein said dust collecting device is an electric filter.

13. The steel making plant according to claim 1, wherein said at least one filtration apparatus is a bag filter.

14. A steel making plant comprising an electric arc furnace and a fume collection and treatment system for collecting and treating the gaseous emissions produced by said steel making plant, wherein said fume collection and treatment system comprises:

a first primary suction line fluidically connected to the electric arc furnace to suck fumes generated in said electric arc furnace;

a secondary suction line configured for ventilating an environment surrounding the electric arc furnace by at least one suction hood;

at least one filtration apparatus configured for filtering emissions collected by said fume collection and treatment system before discharge of the emissions into the atmosphere; and a containment casing configured to close a connection zone between the continuous charging system and the electric arc furnace, wherein said fume collection and treatment system comprises a sealing suction line which is fluidically connected to said containment casing to suck air infiltrating inside said containment casing, said sealing suction line flowing into the secondary suction line or directly into the first primary suction line in the section between the denox apparatus and the filtration apparatus, wherein the sealing suction line comprises at least one fan, actuation of which is controlled depending on a pressure inside the containment casing, measured by at least one pressure sensor;

wherein the electric arc furnace is fed by a continuous charging system and wherein along said first primary suction line, starting from the electric arc furnace a fume cooling apparatus, a dust collecting device and a denox selective catalytic reduction apparatus are arranged in sequence, and wherein the secondary suction line flows into the first primary suction line downstream of the denox selective catalytic reduction apparatus and upstream of said at least one filtration apparatus.

15. A method of collecting and treating fumes generated by a steel making plant comprising an electric arc furnace and a fume collection and treatment system for collecting and treating gaseous emissions produced by said steel making plant, wherein said fume collection and treatment system comprises:

a first primary suction line fluidically connected to the electric arc furnace to suck fumes generated in said electric arc furnace;

a secondary suction line configured for ventilating an environment surrounding the electric arc furnace by at least one suction hood; and at least one filtration apparatus configured for filtering emissions collected by said fume collection and treatment system before discharge of the emissions into the atmosphere, wherein said method comprises:

preventing direct emitting of fumes into the environment from the electric arc furnace during furnace charging phases by a continuous charging system so that air sucked by the secondary suction line is substantially uncontaminated by fumes coming directly from the electric arc furnace; and treating the fumes collected by the first primary suction line in a denox selective catalytic reduction apparatus before sending the fumes to the filtration apparatus together with the fumes collected by the secondary suction line, so as not to dilute and cool the fumes sucked from the electric arc furnace with the fumes sucked by the secondary suction line before treating the fumes in the denox apparatus, wherein prior to treating the fumes collected by the first primary suction line in the denox catalytic reduction apparatus said fumes are freed from dust in a dust collecting device and are cooled in a fume cooling apparatus, so as to bring a temperature of said fumes within a predefined temperature range according to operating requirements of the denox apparatus; and wherein during tapping phases of molten steel from the electric arc furnace the fumes collected by the first primary suction line are sent to the filtration apparatus by-passing the denox selective catalytic reduction apparatus, so as not to send to the denox selective catalytic reduction apparatus cold fumes having temperatures below a predefined temperature range according to the operating requirements of the denox apparatus.

16. The method according to claim 15, wherein said steel making plant comprises at least one ladle furnace and wherein said fume collection and treatment system comprises a second primary suction line which is fluidically connected to said ladle furnace to suck fumes generated in said ladle furnace, wherein the fumes collected by said second primary suction line are combined with the fumes collected by said first primary suction line before cooling in the fume cooling apparatus.

17. The method according to claim 15, wherein said steel making plant comprises one or more auxiliary suction lines which are configured to operationally support steel production activity, wherein said one or more auxiliary suction lines are fluidically connected to the respective auxiliary station to suck emissions generated by said station, wherein the emissions collected by each auxiliary suction line are sent directly to the filtration apparatus.

* * * * *